(12) United States Patent
Baumeier et al.

(10) Patent No.: US 6,193,301 B1
(45) Date of Patent: Feb. 27, 2001

(54) CONVERTIBLE VEHICLE

(75) Inventors: Andreas Baumeier, Belm; Melanie Eitermann, Wuppertal, both of (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 0 days.

(21) Appl. No.: 09/162,490

(22) Filed: Sep. 28, 1998

(30) Foreign Application Priority Data

Sep. 27, 1997 (DE) .......................................... 297 17 325 U

(51) Int. Cl.[7] .................................................... B60J 7/185
(52) U.S. Cl. .................................... 296/121; 292/DIG. 4; 292/DIG. 5
(58) Field of Search ...................... 296/121; 292/DIG. 4, 292/DIG. 5, 336.3

(56) References Cited

U.S. PATENT DOCUMENTS 2,014,284 * 9/1935 Mobbs ........................... 292/DIG. 5
4,820,094 * 4/1989 Hirakui et al. .................. 292/DIG. 5

FOREIGN PATENT DOCUMENTS

155986 * 4/1939 (DE) ..................................... 296/121
1237504 * 4/1960 (FR) ................................. 292/336.3

* cited by examiner

*Primary Examiner*—Dennis H. Pedder
(74) *Attorney, Agent, or Firm*—Jordan and Hamburg LLP

(57) ABSTRACT

For a convertible vehicle with a top, which can be locked to the windshield frame, for which at least one movable handle is provided for carrying out the locking and unlocking, the handle can be transferred from its operating position, in which it is accessible to a movement, which brings about the locking or unlocking of the top, into an inoperative position, which is located essentially vertically upwards from the operating position, in which it is in an area, which does not limit the head freedom. When the handle in the inoperative position is lowered into a recess formed between lining parts, a flush closure of the handle with the lining parts can be attained.

19 Claims, 5 Drawing Sheets

Fig.7
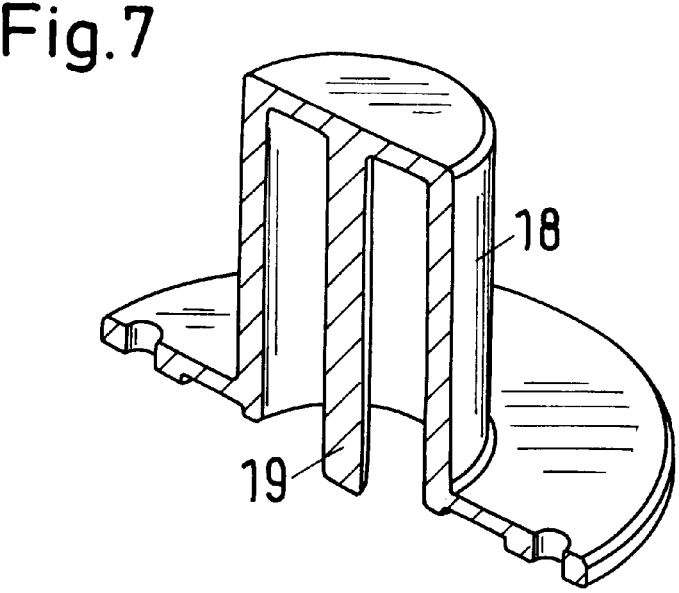
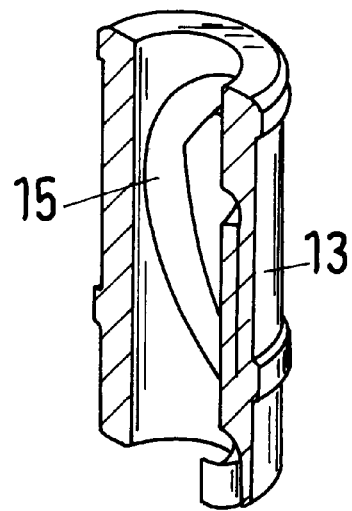
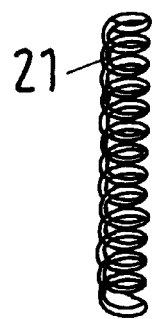

CONVERTIBLE VEHICLE

BACKGROUND OF THE INVENTION

The invention relates to a convertible vehicle with a top, which can be locked at a windshield frame, one movable handle being provided for actuating the locking and unlocking.

For convertible vehicles of this type, one central handle, for example, is provided which, by means of, for example, a swiveling motion about a vertical or horizontal axis, moves locking elements of the top into or out of engagement with corresponding counter pieces of the windshield frame. Such handles, so that they can be operated well and transfer sufficient mechanical force, usually are constructed relatively large and, for actuation, can be grasped by the whole hand. During non-use, such a handle frequently is visually disturbing and constricts the space close to the windshield frame. Moreover, there is the danger of collision with the head during an accident and there is no assurance against malfunctioning while the vehicle is being driven.

SUMMARY OF THE INVENTION

It is an object of the invention to improve a convertible vehicle of the type named above so that the disadvantages names are eliminated.

By transferring the handle from its operating position into a vertically upwards located inoperative position, the handle can be brought into a region, where it does not disturb visually nor limit the freedom of the head.

When the handle in the inoperative position is countersunk into a recess between the lining parts, a flush closure of the handle with the lining parts can be reached in the inoperative position.

Further advantages and distinguishing features arise out of the following description of examples of the object of the invention which are illustrated in the accompanying drawings.

BRIEF DESCRIPTION OF THE DRAWINGS

FIG. 7 shows an exploded representation of the support of the handle and of the sleeve having a connecting link guide.

DESCRIPTION OF THE PREFERRED EMBODIMENTS

Figure 1:
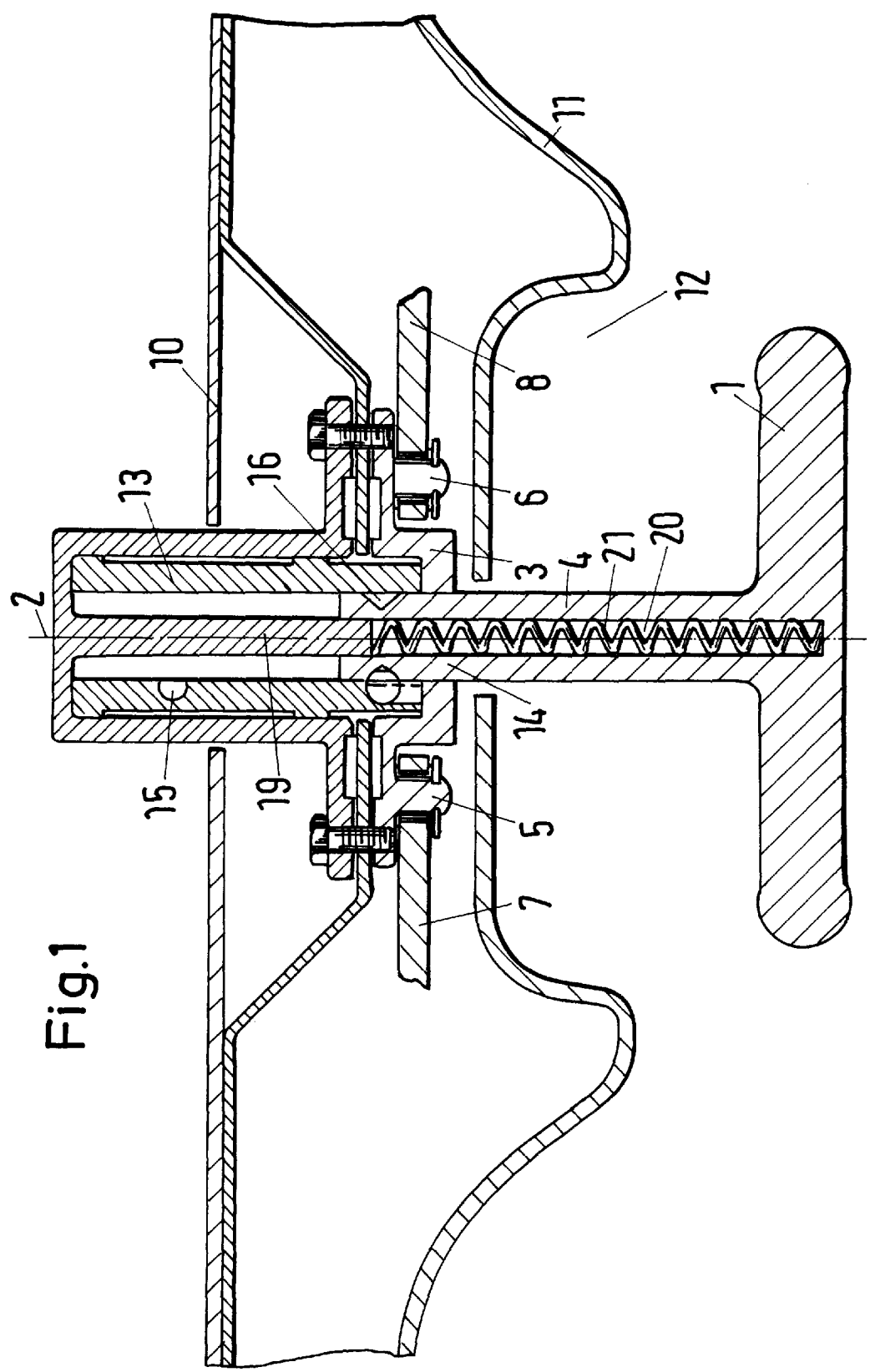
FIG. 1 shows a cross section through an inventive handle in the operating position.

The handle 1, shown in the operating position in FIG. 1, can be swiveled about a vertical axis 2 and, due to this swiveling motion, the driving disk 3, which is held positively on the shaft 4 of the handle 1, is swiveled with the handle 1. Consequently, trunnions 5 and 6, on which a push-pull linkage 7, 8 is supported, also attain a pivoting motion and provide an inwardly or outwardly directed pulling or pushing movement of the linkage 7, 8 along the transverse axis of the vehicle. As a result, locking devices, which are fastened, for example, at the edge of the windshield frame, can be brought out of or into engagement with corresponding counter pieces of the windshield frame.

The positive connection between the shaft 4 of the handle 1 and the driving disk 3 can be reached, for example, owing to the fact that the shaft 4 has a hexagon insert bit and that the driving disk 3 has a central borehole 9 with a corresponding hexagon socket. Of course, other positive connections are also possible here.

Figure 2:
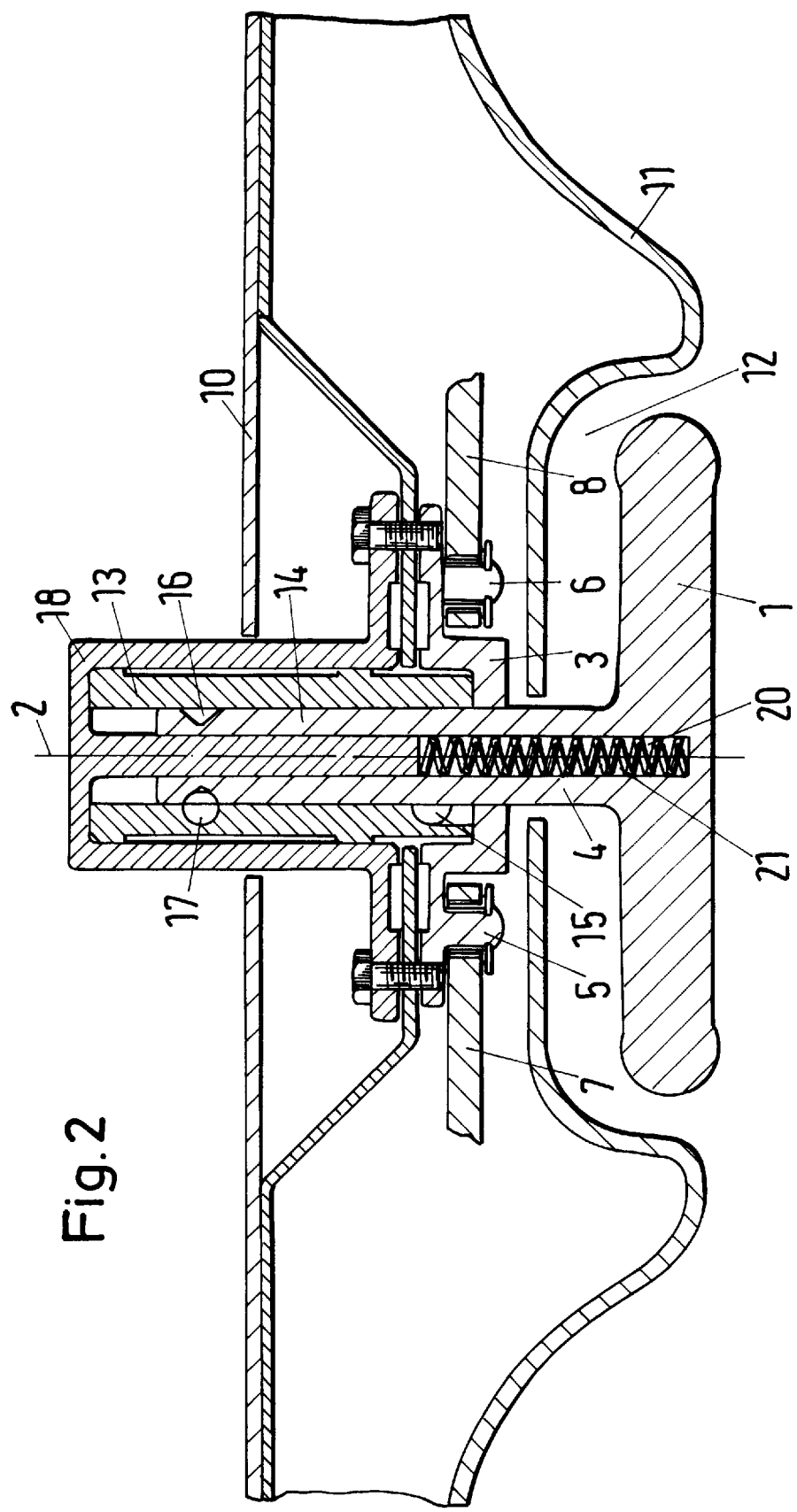
FIG. 2 shows a view similar to that of FIG. 1 in the inoperative position of the handle.

The handle 1 is disposed in the front roof peak 10 of the convertible top, this region 10 of the roof being closed off on the underside by lining parts 11, which leave a recess 12 in the region of the handle 1. In the inoperative position, the handle 1 is countersunk into this recess 12, the transfer between the operating position (FIG. 1) and inoperative position (FIG. 2) representing a vertically upwards directed pressure movement.

Guiding parts 13 and 14 guide this lifting movement of the handle 1, guide part 13 forming a sleeve and guide part 14 a cylindrical lifting part, which can be moved in this sleeve. Guide part 14 is formed by the upper region of the shaft 4 of the handle 1.

Figure 3:
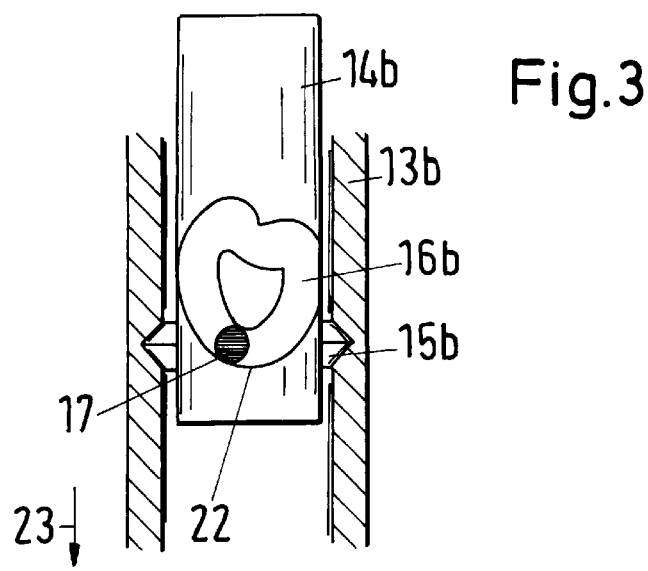
FIG. 3 shows guiding parts for the travel movement provided with connecting link guides in partial cross-sectional view with the handle in the extended position.
Figure 4:
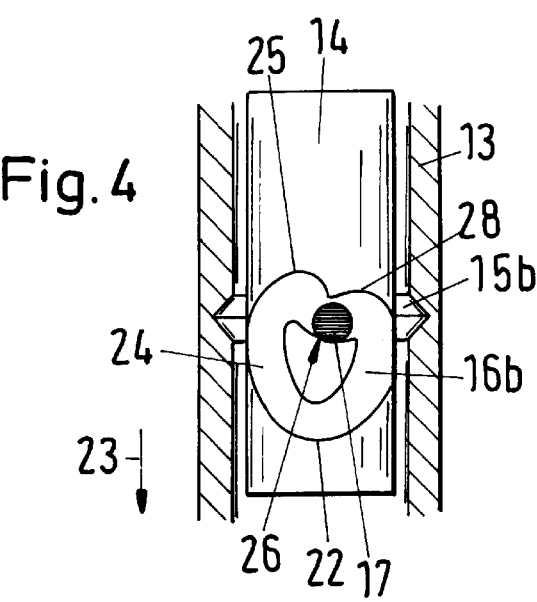
FIG. 4 shows a view similar to that of FIG. 3 with the handle in the inoperative position.
Figure 5:
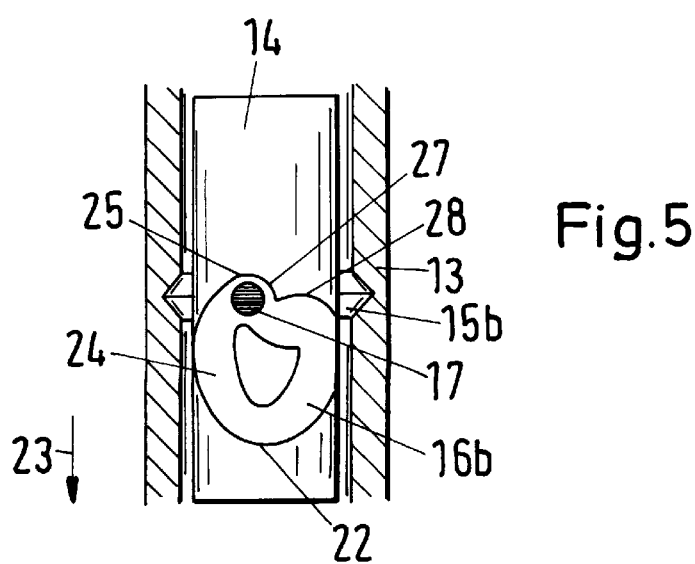
FIG. 5 shows a view similar to that of FIG. 4, a vertically upward directed force being exerted on the handle, which previously was in the inoperative position.
Figure 6:
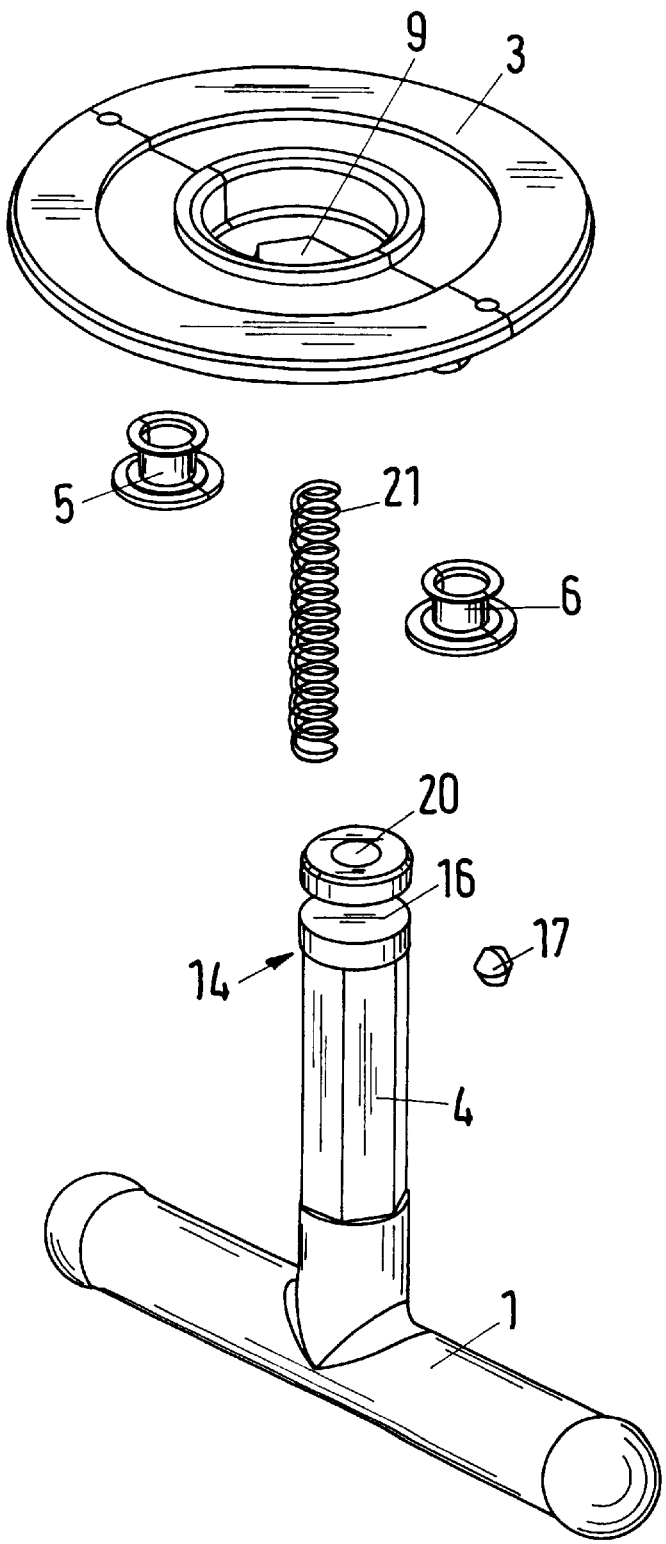
FIG. 6 shows an exploded representation of the handle and of a driving disk, which is supported on the handle and actuates the locking device.

The lifting part 14 as well as the sleeve 13 are each provided with a connecting link guide 15 and 16 respectively. According to FIGS. 1 and 2, the connecting link guide 15 of sleeve 13 of the example forms a heart-shaped connecting link with vertically extending portions—other shapes of connecting links are, of course, possible—and the connecting link 16 of the lifting part 14 forms a peripheral ring connecting link. In the representation of FIGS. 3 to 5, the relationships are reversed.

In the connecting link guides 15, 16, there is a guide body 17, which can be constructed, for example, as a ball—also as a wedge or roller—and the movement space of which is limited to the region, in which the connecting link guides 15 of the sleeve 13 and 16 of the lifting part 14 are opposite one another.

The sleeve 13 is held by a cup-shaped accommodating part 18, which is disposed in a stationary manner at the front roof part 10 and embraces the sleeve 13. Instead of being constructed in one piece, the sleeve 13, as well as the accommodating parts 18 surrounding it, can also be formed, for example, of two half shells.

The accommodating part 18 has a central, vertically downwards directed cross member 19 which, in the assembled state of the parts, engages a central borehole 20, which is disposed in the shaft 4 of the handle 1. As a result, the shaft 4, which also embraces the lifting part 14, is guided vertically from the outside by the sleeve 13 as well as, over the borehole 20, from the inside by the cross member 19, in order effectively thus to prevent any tilting of the handle 1 during the vertical upwards and downwards movements. Moreover, between the lower edge of the cross member 19 and the end of the blind borehole 20, a spring element, in this case a helical spring 21, is disposed, which is under tension in the inoperative position and therefore exerts a downward force on the handle 1 acting in the direction of the operating position.

FIGS. 3 to 5 shown an alternative construction, in which the lifting part 14b is stationary and the sleeve 13b can be moved vertically relative to the lifting part 14b, the sleeve 13b being connected with the handle 1. The spring action is therefore such that the sleeve 13b in FIGS. 3 to 5 is under tension vertically downward in the direction of arrow 23 and the adjoining handle 1 consequently is pressed in the direction of its operating position.

In FIG. 3, the handle 1 is in the operating position and the movable guiding body 17, which is held in the annular connecting link 15b of the sleeve 13b as well as in the heart-shaped connecting link 16b of the cylindrical lifting part 14b is in an equilibrium position 22. On the one hand, the force of the spring 23 acts vertically downwards over the annular connecting link 15b onto the ball 17. On the other, the lower curvature 22 of the heart-shaped connecting link 16b provides a restricted guidance, so that the ball 17 cannot move further downwards and the handle 1 accordingly cannot move downward beyond the position shown in FIG. 3.

By pressing the handle 1 and the sleeve 13 attached thereto in a vertically upwards directed motion against the force of the spring 23, the ball 17 moves over the vertical section 24 of the connecting link 16b up to an upper stop curvature 25, which prevents further upward movement of the sleeve 13 and the ball 17 held therein over the connecting link guide 15b. By stopping the vertically upwardly directed pressure movement, exerted by hand, the ball 17 then falls into the equilibrium position 26, since then the sleeve 13 and the connecting link guide 15 are acted upon once again in a determining manner by the force of the spring 23, so that the ball 17, accommodated therein, is acted upon with force in the sense of a vertical downward movement. This downward movement is then prevented by the stop curvature 26 of the heart-shaped connecting link 16b, so that a stable equilibrium position of the ball 17 is formed here also and therefore the extended position of FIG. 3 as well as the retracted position of the handle 1 of FIG. 4 are determined by an equilibrium position of the ball 17 in the heart-shaped connecting link 16b.

In order to reach the operating position from the inoperative position of the handle 1 of FIG. 4, initially a vertically upwards directed compressive force is exerted on the handle 1, so that the ball 17 in the heart-shaped connecting link 16b is guided by the curvature 27, located essentially vertically above the equilibrium position 26, into the stop curvature 28, from which it then, when the vertically upward directed compression is stopped, glides downward into the equilibrium position 22 due to the force of the spring 23, so that the pulled-out operating position of the handle 1 of FIG. 3 is restored once again then. To loosen the handle 1 out of its inoperative position, only a vertically upwards directed pressure need be exerted, for which the handle 1 need not be embraced and pulled. The handle 1 can therefore be lowered completely into the lining parts 11 without having to leave a handle gap between the handle 1 and the lining parts 11.

Since the guiding body 17 is in an equilibrium position in the inoperative and operating positions, a malfunctioning is precluded and a stable intermediate position of the handle 1 between the inoperative and operating positions is not possible because of the action of the spring.

Due to the construction of the two connecting link guides 15, 16 and 15b, 16b, it is possible to do without stop shoulders or similar mechanical parts, which are subject to the danger of breaking. The transfer of the handle 1 from the operating position into the inoperative position as well as the reverse transfer into the operating position are to be carried out in the same way by the user by a vertically upward directed pressure on the handle 1, so that the operating relationships for the user are very simple.

What we claim is:

1. Apparatus for locking a convertible top of a vehicle with a windshield frame of the vehicle comprising a handle, a handle support supporting said handle on said convertible top for movement between an operable position and an inoperable position, said handle when in said operable position being accessible to the motor vehicle operator to effect locking and unlocking of the top to the windshield frame, said handle when in said inoperable position being displaced substantially vertically and linearly upwardly from said operable position.

2. Apparatus according to claim 1 wherein said convertible top has a lining part having a recess, said handle being disposed substantially in said recess when said handle is in said inoperable position.

3. Apparatus according to claim 2 wherein said recess is a generally inverted cup-shaped recess having an opening facing substantially downwardly.

4. Apparatus for locking a convertible top of a vehicle with a windshield frame of the vehicle comprising a handle, a handle support supporting said handle for movement between an operable position and an inoperable position, said handle when in said operable position being accessible to the motor vehicle operator to effect locking and unlocking of the top to the windshield frame, said handle when in said inoperable position being displaced substantially vertically upwardly from said operable position, said handle including a first elongate structural part, said handle support including a second elongate structural part, said first and second elongate structural parts being longitudinally aligned and disposed to provide relative longitudinal movement between said first and second elongate structural parts, each of said elongate structural parts having linking grooves and a moveable linking body disposed in said linking grooves for linking the relative movement between said first and second elongate structural parts.

5. Apparatus for locking a convertible top of a vehicle with a windshield frame of the vehicle comprising a handle, a handle support supporting said handle for movement between an operable position and an inoperable position, said handle when in said operable position being accessible to the motor vehicle operator to effect locking and unlocking of the top to the windshield frame, said handle when in said inoperable position being displaced substantially vertically upwardly from said operable position, said handle including a first elongate structural part, said handle support including a second elongate structural part, said first and second elongate structural parts being longitudinally aligned and disposed to provide relative longitudinal movement between said first and second elongate structural parts, one of said elongate structural parts includes a first linking groove, the other of said elongate structural parts including a second linking groove having at least one portion extending generally in a vertical direction, and a moveable linking body disposed in said first and second linking grooves.

6. Apparatus for locking a convertible top of a vehicle with a windshield frame of the vehicle comprising a handle, a handle support supporting said handle on said convertible top for movement between an operable position and an inoperable position, said handle when in said operable position being accessible to the motor vehicle operator to effect locking and unlocking of the top to the windshield frame, said handle when in said inoperable position being displaced substantially vertically upwardly from said operable position, said handle including a first elongate structural part, said handle support including a second elongate structural part, said first and second elongate structural parts being longitudinally aligned and disposed to provide for relative longitudinal movement between said first and second elongate structural parts, said first and second elongate parts having one relative longitudinal position when said handle is in said operable position, said first and second elongate parts having another relative longitudinal position longitudinally spaced from said one relative longitudinal position when said handle is in said inoperable position.

7. Apparatus according to claim 6 wherein each of said elongate structural parts has linking guides and a moveable linking body disposed in said linking guides for linking the relative movement between said first and second elongate structural parts.

8. Apparatus according to claim 7 wherein said linking guides are grooves in said first and second elongate structural parts.

9. Apparatus according to claim 8 wherein said moveable linking body is a spherical ball.

10. Apparatus according to claim 7 wherein the linking guide on one of said elongate structural parts is an annular groove, the linking guide on the other of said elongate structural parts is a groove having at least one groove part substantially vertically disposed.

11. Apparatus according to claim 10 wherein the linking guide groove in said other of said elongate structural members has a generally heart-shaped configuration having two equilibrium sections, said moveable linking body when in one of said equilibrium sections determining the operable position of the handle, said moveable linking body when in the other of said equilibrium sections determining the inoperable position of the handle.

12. Apparatus according to claim 6 further comprising a biasing device disposed between said first and second elongate structural parts for biasing said handle towards said operable position.

13. Apparatus according to claim 6 wherein said first elongate structural part is a sleeve and said second elongate structural part is an elongate element fixed to said handle and slidable in said sleeve.

14. Apparatus according to claim 6 wherein said first elongate structural part is a sleeve fixed to said handle and said second elongate structural part is an elongate element slidable in said sleeve.

15. Apparatus according to claim 6 wherein one of said elongate structural parts includes a first linking groove, said first linking groove being an annular ring groove, the other of said elongate structural parts including a second linking groove having at least one portion extending generally in a vertical direction, and a moveable linking body disposed in said first and second linking grooves when said handle is in said operable and inoperable positions and when said handle is moved between said operable and inoperable positions.

16. Apparatus according to claim 15 wherein said one elongate structural part is said first elongate structural part, said first elongate structural part being fixed to said handle, said handle being rotatable relative to said second elongate structural part as said moveable linking body moves in said annular ring groove.

17. Apparatus according to claim 10 wherein said linking guide groove in said other of said structural members includes a first and second equilibrium sections and an intermediate section, said moveable linking body being in said first equilibrium section when said handle is in said inoperable position, said moveable linking body being in said second equilibrium position when said handle is in said operable position, said moveable linking body moving from said first equilibrium position to said intermediate position and then to said second equilibrium position when said handle is moved from said inoperable position to said operable position, said other structural member being an elongate structural member having an elongate axis, said first equilibrium section, said second equilibrium section and said intermediate section of said linking groove being longitudinally spaced from one another along said elongate axis, said first equilibrium section being disposed between said second equilibrium section and said intermediate section along said elongate axis.

18. An apparatus for locking a convertible top of a vehicle with a windshield frame of the vehicle comprising a handle, a handle support supporting said handle on said convertible top for movement between an operable position and an inoperable position, said handle when in said operable position being accessible to the motor vehicle operator to effect locking and unlocking of the top to the windshield frame, said handle support including biasing means biasing said handle towards said operable position, said handle when in said inoperable position being displaced substantially vertically upwardly from said operable position.

19. Apparatus for locking a convertible top of a vehicle with a windshield frame of the vehicle comprising a handle, a handle support supporting said handle on said convertible top for movement between an operable position and an inoperable position, said handle when in said operable position being accessible to the motor vehicle operator to effect locking and unlocking of the top to the windshield frame, said handle when in said inoperable position being displaced substantially vertically upwardly from said operable position, said handle being operable to be moved from its inoperable position to its operable position by application of a vertical upwardly directed force applied to the handle by the motor vehicle operator.

* * * * *